(12) United States Patent
Lee et al.

(10) Patent No.: US 12,381,586 B2
(45) Date of Patent: Aug. 5, 2025

(54) POWER RF SWITCH

(71) Applicants: SKAIChips Co., Ltd., Suwon-si (KR);
Research & Business Foundation SUNGKYUNKWAN UNIVERSITY, Suwon-si (KR)

(72) Inventors: Kang Yoon Lee, Seoul (KR); Behnam Samadpoor Rikan, Suwon-si (KR); Young Gun Pu, Suwon-si (KR); Jong Wan Jo, Suwon-si (KR)

(73) Assignees: SKAIChips Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 359 days.

(21) Appl. No.: 17/985,095

(22) Filed: Nov. 10, 2022

(65) Prior Publication Data
US 2023/0155613 A1    May 18, 2023

(30) Foreign Application Priority Data
Nov. 15, 2021    (KR) .................. 10-2021-0157073

(51) Int. Cl.
*H04B 1/04*    (2006.01)
*H04B 1/00*    (2006.01)

(52) U.S. Cl.
CPC .......... *H04B 1/0458* (2013.01); *H04B 1/006* (2013.01); *H04B 2001/0416* (2013.01)

(58) Field of Classification Search
CPC ........ H04B 1/006; H04B 1/04; H04B 1/0458; H04B 1/38; H04B 1/3827; H04B 1/3833; H04B 1/40; H04B 1/401; H04B 1/44; H04B 1/48; H04B 2001/0416
See application file for complete search history.

(56) References Cited

U.S. PATENT DOCUMENTS

| | | | | |
|---|---|---|---|---|
| 7,437,129 B2* | 10/2008 | Nakajima | ............. | H03F 1/0277 455/552.1 |
| 8,461,919 B2* | 6/2013 | Kim | ....................... | H03K 17/94 327/564 |
| 8,472,887 B2* | 6/2013 | Penn | ........................ | H04B 1/40 455/73 |
| 9,231,780 B2* | 1/2016 | Yoo | ......................... | H04L 12/50 |
| 9,531,375 B2* | 12/2016 | Na | ........................ | H03K 17/693 |

* cited by examiner

*Primary Examiner* — Quochien B Vuong
(74) *Attorney, Agent, or Firm* — Insight Law Group, PLLC; Seung Lee

(57) ABSTRACT

A power radio frequency (RF) switch used in wireless communication is disclosed. A boosted switching control signal, which swings between a boosted supply voltage in which a system supply voltage is boosted and a negative supply voltage in which a polarity of the system supply voltage is inverted, is applied to a gate of a high-voltage transistor. Further, a substrate control signal which is synchronized with the boosted switching control signal, and swings between the negative supply voltage and a reference voltage may be applied to a substrate of the high-voltage transistor thereof.

5 Claims, 13 Drawing Sheets

POWER RF SWITCH

CROSS-REFERENCE TO RELATED APPLICATION

This application claims priority from Korean Patent Application No. 10-2021-0157073, filed on Nov. 15, 2021, in the Korean Intellectual Property Office, the disclosure of which is incorporated herein by reference in its entirety.

BACKGROUND

1. Field

The following description relates to a technology related to a power radio frequency (RF) switch used in wireless communication, specifically, a technology related to a semiconductor power RF switch.

2. Description of Related Art

In a terminal implementing wireless mobile communication standards such as global systems for mobile communications (GSM) and code-division multiple access (CDMA), a power radio frequency (RF) switch is employed to switch between two paths: a reception path which outputs a signal received from an antenna to a receiver; and a transmission path which transmits an output of a transmitter to the antenna. Since a signal having extremely low power mixed with noise is applied to an input terminal of the reception path, and extremely high power is output from an output terminal of the transmission path, the power RF switch has a burden of processing both a low power signal of the reception path and a high power signal of the transmission path. In addition, a high-voltage transistor having a higher rating voltage is applied to the power RF switch to ensure an operation under the absolute maximum rating (AMR) condition.

Meanwhile, a system supply voltage employed by the power RF switch for a low-power operation of a system continues to decrease. However, this high-voltage transistor has very poor performance at a low switching control voltage. Accordingly, ensuring performance specifications required in the power RF switch, for example, insertion loss (IL), harmonic distortion, or intermodulation distortion is becoming increasingly difficult.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to improving the performance of a power radio frequency (RF) switch in a low system supply voltage environment.

Further, the following description relates to preventing a transistor breakdown in a maximum rating condition while improving the performance of a power RF switch in a low system supply voltage environment.

Further, the following description relates to improving the performance of a power RF switch in a system supply voltage environment without increasing a chip area.

In one general aspect, in a power radio frequency (RF) switch, a boosted switching control signal which swings between a boosted supply voltage in which a system supply voltage is boosted and a negative supply voltage in which a polarity of the system supply voltage is inverted is applied to a gate of a high-voltage transistor.

Further, according to another aspect of the present invention, in the power RF switch, a substrate control signal, which is synchronized with the boosted switching control signal applied to the gate of the high-voltage transistor, and swings between the negative supply voltage and a reference voltage, may be applied to a substrate thereof.

Further, according to still another aspect of the present invention, the power RF switch may further include a voltage limiting circuit configured to limit the boosted supply voltage generated by a voltage booster to a predetermined level to prevent a breakdown of the high-voltage transistor under an absolute maximum rating (AMR) condition.

Further, according to yet another aspect of the present invention, a capacitor of an output terminal of any one of the voltage booster and a negative charge pump may include a structure in which a metal-oxide-semiconductor (MOS) capacitor, a metal-oxide-metal (MOM) capacitor, and a metal-insulator-metal (MIM) capacitor are sequentially stacked and connected in parallel.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects are embodied through the embodiments described with reference to the accompanying drawings. It is understood that the components of each embodiment may be variously combined within one embodiment or components of another embodiment unless otherwise mentioned or contradicted by each other. The terms used in the specification and the claims should be interpreted as meanings and concepts consistent with the invention or the proposed technical spirit based on the principle that the inventor may appropriately define the concept of a term to describe the invention thereof in the best way. Hereinafter, preferable embodiments of the present invention will be described in detail with reference to the accompanying drawings.

Description of Invention of Claim 1

According to one aspect of the present invention, in a power radio frequency (RF) switch, a switching control signal which swings between a boosted supply voltage in which a system supply voltage is boosted and a negative supply voltage in which a polarity of the system supply voltage is inverted is applied to a gate of a high-voltage transistor. Here, the system supply voltage refers to a primary power supply voltage supplied to a semiconductor chip or circuit manufactured according to the present invention.

Figure 1:
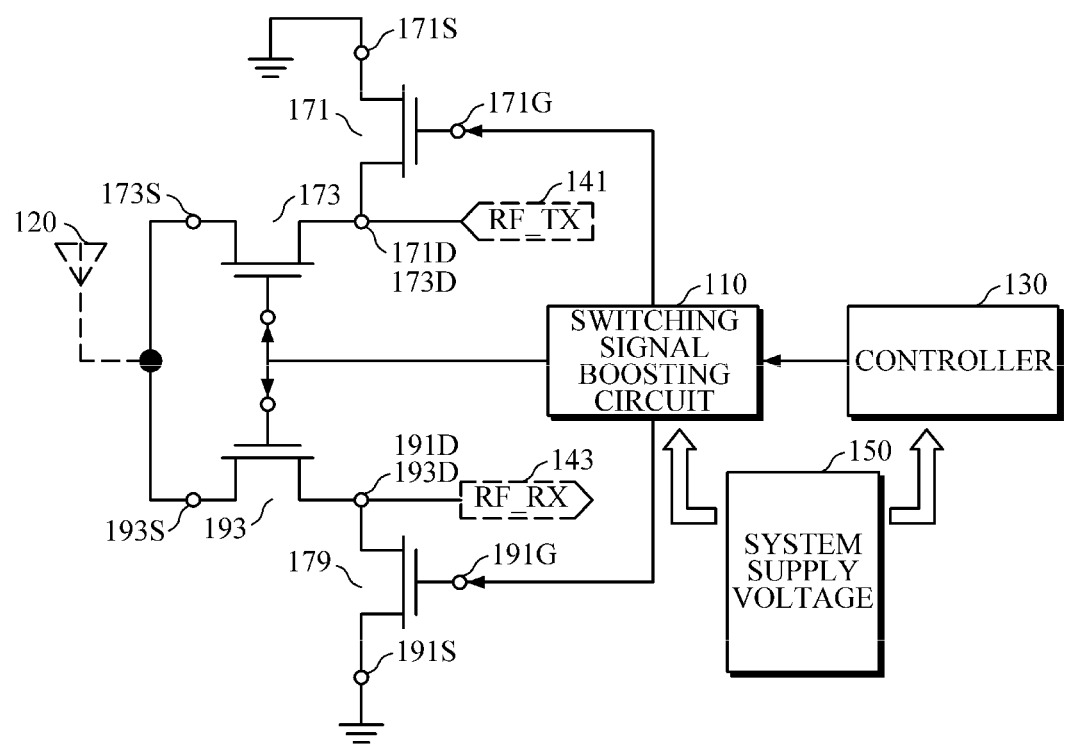
FIG. 1 is a block diagram illustrating a configuration of a power radio frequency (RF) switch according to one embodiment.

FIG. 1 is a block diagram illustrating a configuration of a power RF switch according to one embodiment to which one aspect is applied. In FIG. 1, an antenna 120, a transmission circuit 141, and a reception circuit 143 are shown with dotted lines to represent that the antenna 120, the transmission circuit 141, and the reception circuit 143 are external components, not components according to the present invention. As shown in the drawings, the power RF switch according to one embodiment includes transmission semiconductor switches 171 and 173, reception semiconductor switches 191 and 193, a controller 130, and a switching signal boosting circuit 110. The power RF switch according to one embodiment is implemented as a single semiconductor integrated circuit. However, the present invention is not limited thereto, and the power RF switch may be implemented as a circuit in which several semiconductor elements are connected, or one integrated circuit and several elements are connected.

In the illustrated embodiment, for convenience of illustration, each of the transmission semiconductor switches 171 and 173 and the reception semiconductor switches 191 and 193 are shown as a double-pole double throw (DPDT) type switch implemented with two field-effect transistors (FETs), but are not limited thereto, and may be one of known power RF switch structures implemented as a circuit suitable for switching a high-power RF signal and including a plurality of FETs.

The transmission semiconductor switches 171 and 173 each have one end connected to an external antenna and the other end connected to an external transmission circuit 141, and are switched by a transmission switching control signal. The reception semiconductor switches 191 and 193 each have one end connected to an external antenna and the other end connected to an external reception circuit, and are switched by a reception switching control signal. The controller 130 outputs a switching control signal which indicates one connected switch of the transmission semiconductor switch and the reception semiconductor switch. In the power RF switch, the controller 130 controls a transmission cycle and a reception cycle by outputting a switching control signal according to an external signal or an internal logic.

The switching signal boosting circuit 110 outputs a transmission switching control signal and a reception switching control signal having opposite phases according to the switching control signal output by the controller 130. Each of the transmission switching control signal and the reception switching control signal swings between the boosted supply voltage in which the system supply voltage is boosted and the negative supply voltage in which the polarity of the system supply voltage is inverted. Since the switching control signal which swings between the boosted supply voltage in which the system supply voltage is boosted and the negative supply voltage in which the polarity of the system supply voltage is inverted is applied to a gate of a high-voltage transistor, a switching characteristic of the high-voltage transistor may be improved.

In one embodiment, the boosted supply voltage may be generated by boosting the system supply voltage through a voltage doubler. Further, in one embodiment, the polarity of the system supply voltage may be inverted through a negative charge pump to generate a negative supply voltage.

Description of Invention of Claim 2

Figure 2:
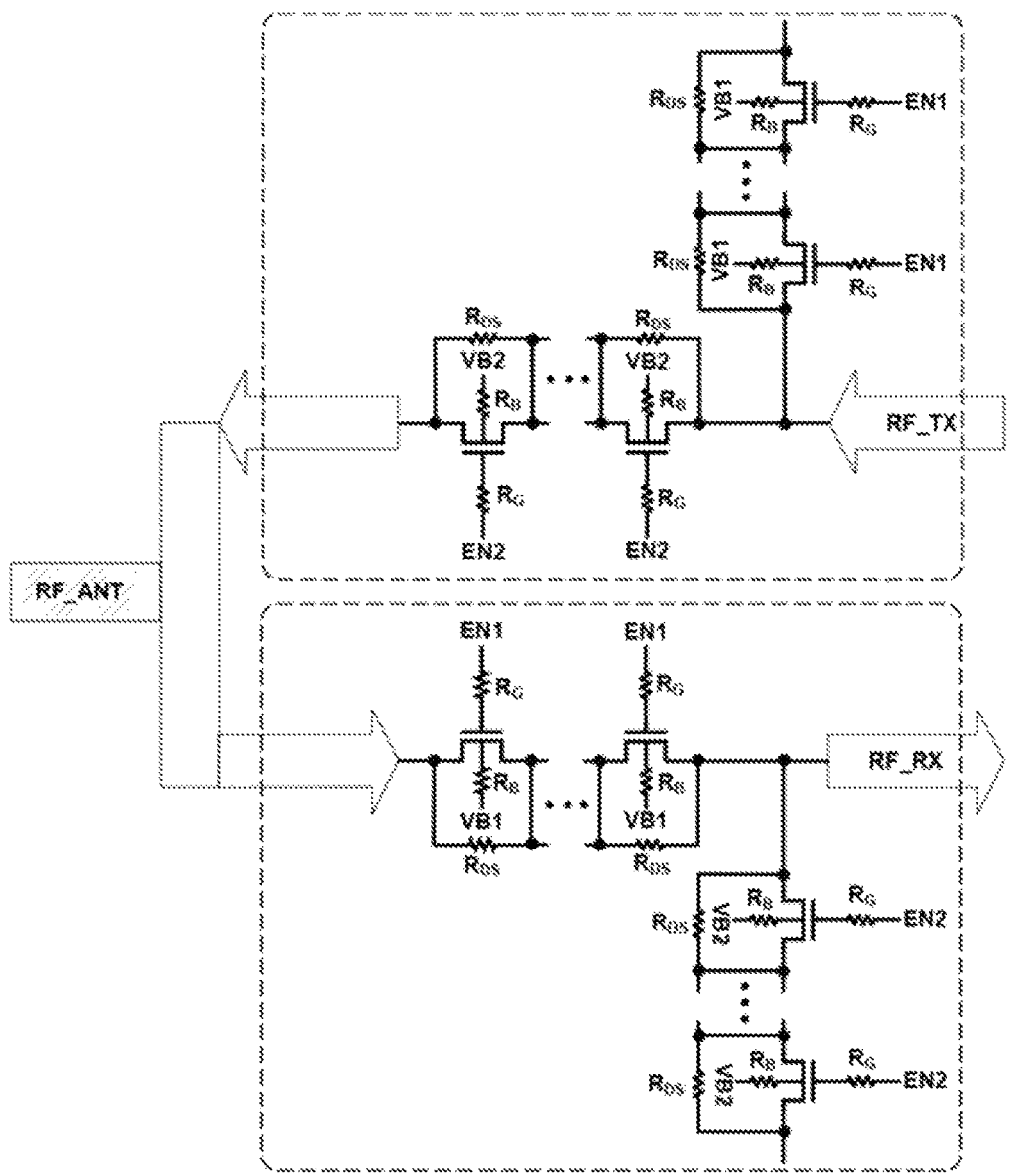
FIG. 2 illustrates a configuration of one embodiment of a transmission semiconductor switch and a reception semiconductor switch that may be employed in the present invention.

FIG. 2 illustrates a configuration of one embodiment of a transmission semiconductor switch and a reception semiconductor switch that may be employed in the present invention. The transmission semiconductor switch has one end connected to an external antenna RF_ANT, and the other end connected to an external transmission circuit RF_TX, and a terminal in an upward direction of the drawing is grounded to a substrate. The reception semiconductor switch has one end connected to the external antenna RF_ANT, and the other end connected to an external reception circuit RF_TX, and a terminal in a downward direction of the drawing is grounded to the substrate. In the illustrated embodiment, each of the transmission semiconductor switch and the reception semiconductor switch has a single pole double throw (SPDT) structure, but the present invention is not limited thereto. Further, a switching path of each of the transmission semiconductor switch and the reception semiconductor switch includes a plurality of high-voltage transistors connected in series to distribute a high voltage.

According to another aspect of the present invention, in the power RF switch, a substrate control signal, which is synchronized with the switching control signal applied to the gate of the high-voltage transistor and swings between a negative supply voltage and a reference voltage, may be applied to the substrate thereof.

Figure 3:
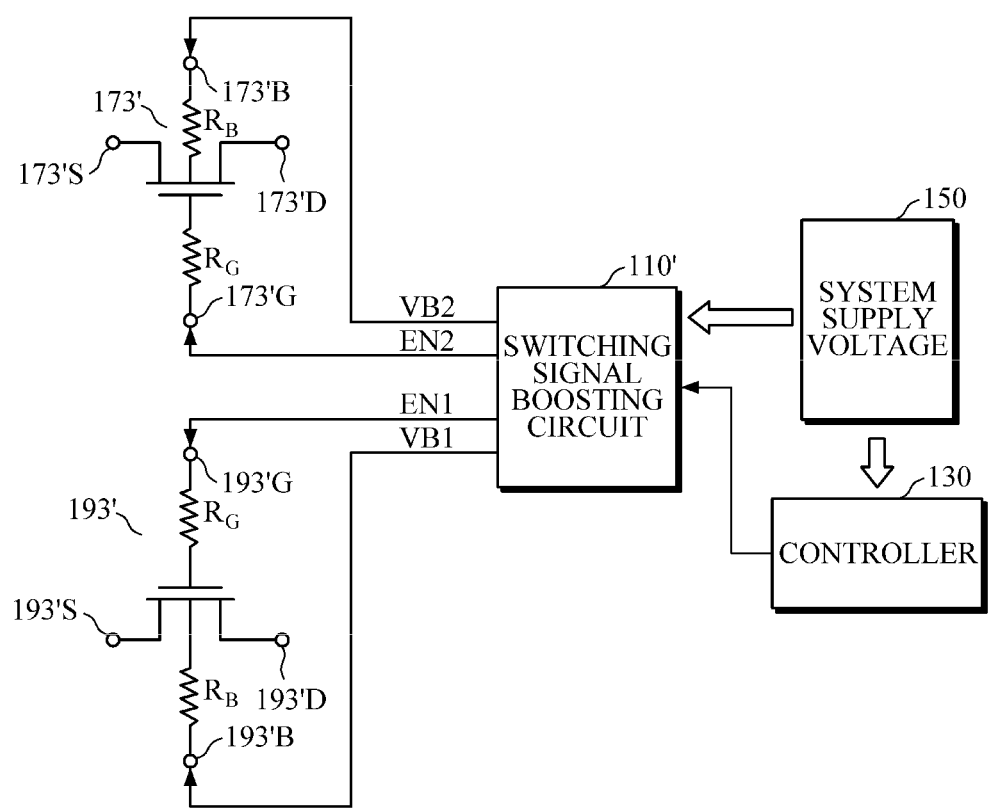
FIG. 3 is a block diagram illustrating a configuration of a power RF switch according to another embodiment.

FIG. 3 is a block diagram illustrating a configuration of a power RF switch according to another embodiment. As shown in the drawing, the power RF switch according to the illustrated embodiment includes transmission semiconductor switches 171 and 173, reception semiconductor switches 191 and 193, a controller 130, and a switching signal boosting circuit 110. Components similar to those of the embodiment in FIG. 1 are referred to by the same reference numerals, and the corresponding components are distinguished by adding a single quote (') to the same number. Further, for convenience of understanding, illustration of the transmission semiconductor switch and the reception semiconductor switch is omitted except for one transmission high-voltage transistor 173' of the transmission semiconductor switch and one reception high-voltage transistor 193' of the reception semiconductor switch. Since the configuration of the controller 130 is similar to that of the embodiment in FIG. 1, a detailed description thereof will be omitted.

According to one aspect, a switching signal boosting circuit 110' respectively outputs a transmission switching control signal EN2 and a reception switching control signal EN1 having opposite phases to a gate 173'G of the transmission high-voltage transistor 173' and a gate 193'G of the reception high-voltage transistor 193'. The transmission switching control signal EN2 and the reception switching control signal EN1 swing between a boosted supply voltage and a negative supply voltage. In one embodiment, a system supply voltage may be boosted through a voltage doubler to generate the boosted supply voltage. Further, in one embodiment, a polarity of the system supply voltage may be inverted through a negative charge pump to generate the negative supply voltage.

According to an additional aspect, the switching signal boosting circuit 110' respectively outputs a transmission substrate control signal VB2 and a reception substrate control signal VB1 having opposite phases to a substrate 173'B of the transmission high-voltage transistor 173' and a substrate 193'B of the reception high-voltage transistor 193'. The transmission substrate control signal VB2 is synchronized with the transmission switching control signal EN2 to swing between the negative supply voltage and the reference voltage. The reception substrate control signal VB1 is synchronized with the reception switching control signal EN1 to swing between the negative supply voltage and the reference voltage. In the illustrated embodiment, the negative supply voltage may be a voltage generated through the above-described negative charge pump.

Figure 4:
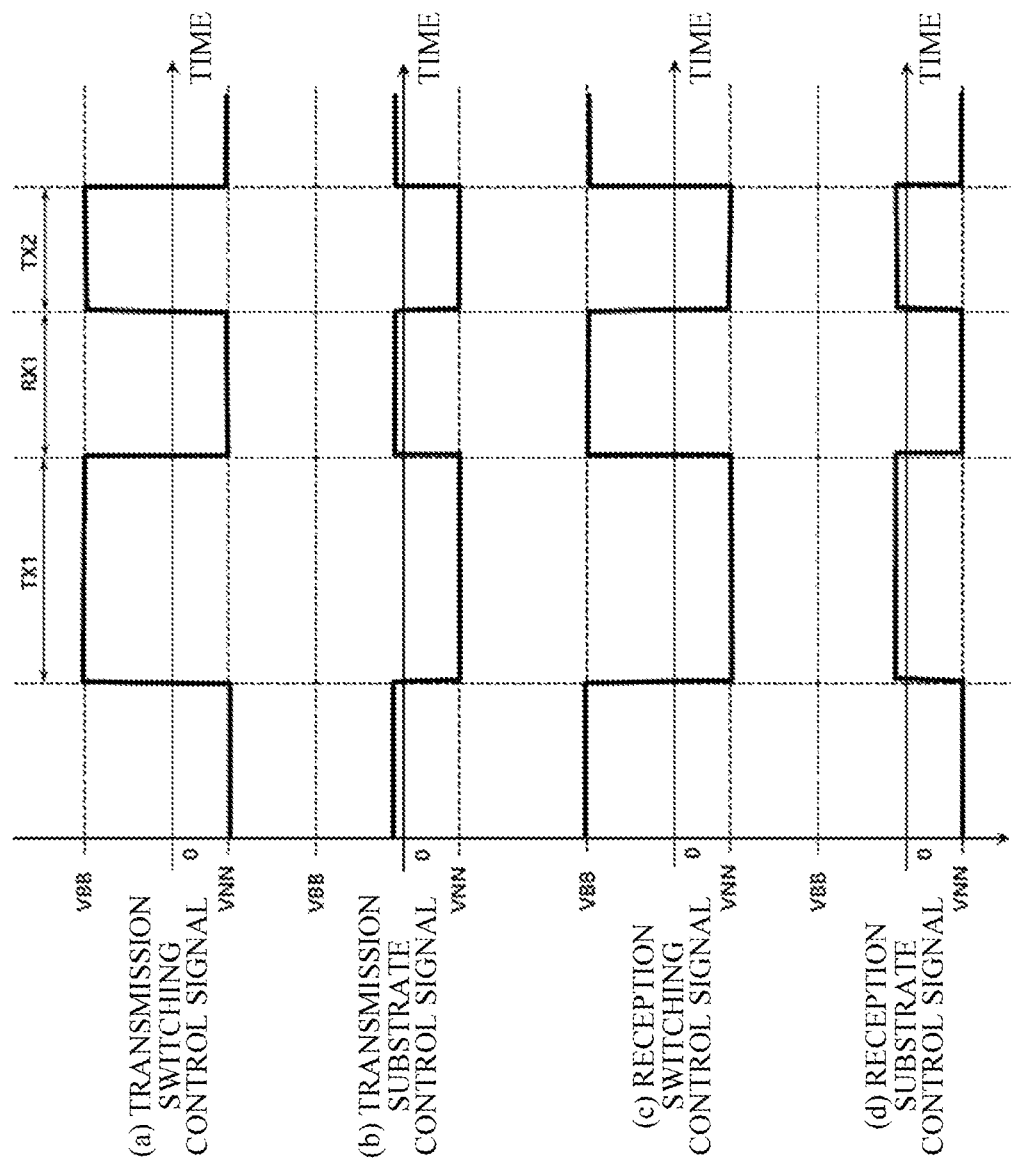
FIG. 4 is a timing diagram illustrating control signals output by a switching signal boosting circuit in the embodiment of FIG. 3.

Description of FIG. 4

FIG. 4 illustrates timings between the control signals output by the switching signal boosting circuit in the embodiment of FIG. 3. In the drawing, VBB is the boosted supply voltage and VNN is the negative supply voltage. As shown in the drawing, the transmission switching control signal EN2 is activated during transmission cycles TX1 and TX2 determined according to the switching control signal output by the controller to output the boosted supply voltage VBB, and is inactivated during a reception cycle RX1 to output the negative supply voltage VNN. Further, the reception switching control signal EN1 has an opposite phase to the transmission switching control signal EN2, is activated during the reception cycle RX1 determined according to the switching control signal output by the controller to output the negative supply voltage VNN, and is deactivated during the transmission cycles TX1 and TX2 to output the boosted supply voltage VBB.

According to an additional aspect, the transmission substrate control signal VB2 is activated during the transmission cycles TX1 and TX2 determined according to the switching control signal output by the controller to output the negative supply voltage VNN, and is inactivated during the reception cycle RX1 to output the reference voltage. Further, the reception substrate control signal VB1 has an opposite phase to the transmission substrate control signal VB2, is activated during the reception cycle RX1 determined according to the switching control signal output by the controller to output the negative supply voltage VNN, and is deactivated during the transmission cycles TX1 and TX2 to output the reference voltage. Here, the reference voltage refers to a base voltage which is a reference for the system supply voltage and usually has a value close to a ground voltage.

Since the boosted supply voltage VBB is applied to the gate 173'G of the transmission high-voltage transistor 173' in FIG. 3 and the negative supply voltage VNN is applied to the substrate 173'B thereof during the transmission cycles TX1 and TX2, a turn-on operation of the transmission high-voltage transistor 173 is improved. Similarly, since the boosted supply voltage VBB is applied to the gate of the reception high-voltage transistor 193' in FIG. 3 and the negative supply voltage VNN is applied to the substrate thereof during the reception cycle RX1, the turn-on operation of the transmission high-voltage transistor 173 is improved.

Description of Invention of Claim 3

Figure 5:
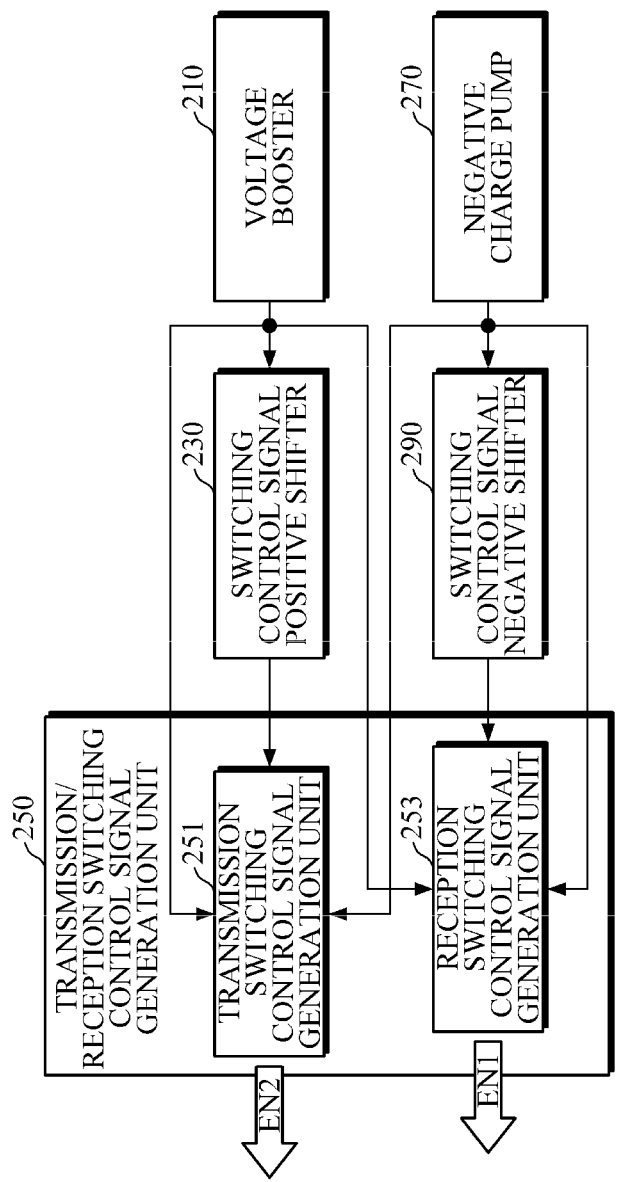
FIG. 5 is a block diagram illustrating a configuration according to one embodiment of a switching signal boosting circuit in FIG. 1.

FIG. 5 is a block diagram illustrating a configuration according to one embodiment of the switching signal boosting circuit 110 in FIG. 1. As shown in the drawing, the switching signal boosting circuit according to one embodiment includes a voltage booster 210, a switching control signal positive shifter 230, a negative charge pump 270, a switching control signal negative shifter 290, and a transmission/reception switching control signal generation unit 250.

In the illustrated embodiment, the positive voltage booster 210 boosts the system supply voltage to output the boosted supply voltage. For example, the positive voltage booster may be implemented as a voltage doubler.

In the illustrated embodiment, the switching control signal positive shifter 230 generates a positively shifted switching control signal which swings between the boosted supply voltage and the system supply voltage from the switching control signal output from the controller (130 in FIG. 1) and outputs the positively shifted switching control signal. To this end, the system supply voltage and the boosted supply voltage generated by the voltage booster 210 are applied to the switching control signal positive shifter 230. The switching control signal positive shifter 230 shifts the switching control signal, which swings between the system supply voltage and the reference voltage, by as much as the system supply voltage to convert the switching control signal to the positively shifted switching control signal which swings between the boosted supply voltage and the system supply voltage.

In the illustrated embodiment, the negative charge pump 270 may invert the polarity of the system supply voltage to output the negative supply voltage. Since a structure of such a negative charge pump is known, a description thereof will be omitted.

In the illustrated embodiment, the switching control signal negative shifter 290 generates a negatively shifted switching control signal, which swings between the reference voltage and the negative supply voltage, from the switching control signal output from the controller (130 in FIG. 1) and outputs the negatively shifted switching control signal. To this end, the system supply voltage and the negative supply voltage generated by the negative charge pump 270 are applied to the switching control signal negative shifter 290. The switching control signal negative shifter 290 shifts the switching control signal, which swings between the system supply voltage and the reference voltage in a negative direction, by as much as the system supply voltage to convert the switching control signal to the negatively shifted switching control signal which swings between the reference voltage and the negative supply voltage.

In the illustrated embodiment, the transmission/reception switching control signal generation unit 250 includes a transmission switching control signal generation unit 251 and a reception switching control signal generation unit 253. The transmission switching control signal generation unit 251 generates a transmission switching control signal controlled by the positively shifted switching control signal generated by the switching control signal positive shifter 230 and the negatively shifted switching control signal generated by the switching control signal negative shifter 290 to swing between the boosted supply voltage and the negative supply voltage and outputs the transmission switching control signal. To this end, the boosted supply voltage generated by the voltage booster 210 and the negative supply voltage generated by the negative charge pump 270 are applied to the transmission switching control signal generation unit 251.

The reception switching control signal generation unit 253 generates a reception switching control signal controlled by the positively shifted switching control signal generated by the switching control signal positive shifter 230 and the negatively shifted switching control signal generated by the switching control signal negative shifter 290 to swing between the boosted supply voltage and the negative supply voltage and outputs the reception switching control signal. To this end, the boosted supply voltage generated by the voltage booster 210 and the negative supply voltage generated by the negative charge pump 270 are applied to the reception switching control signal generation unit 253. Since the reception switching control signal output by the reception switching control signal generation unit 253 and the transmission switching control signal output by the transmission switching control signal generation unit 251 only have opposite phases, the reception switching control signal generation unit 253 may be implemented with the same circuit as the transmission switching control signal generation unit 251.

Figure 7:
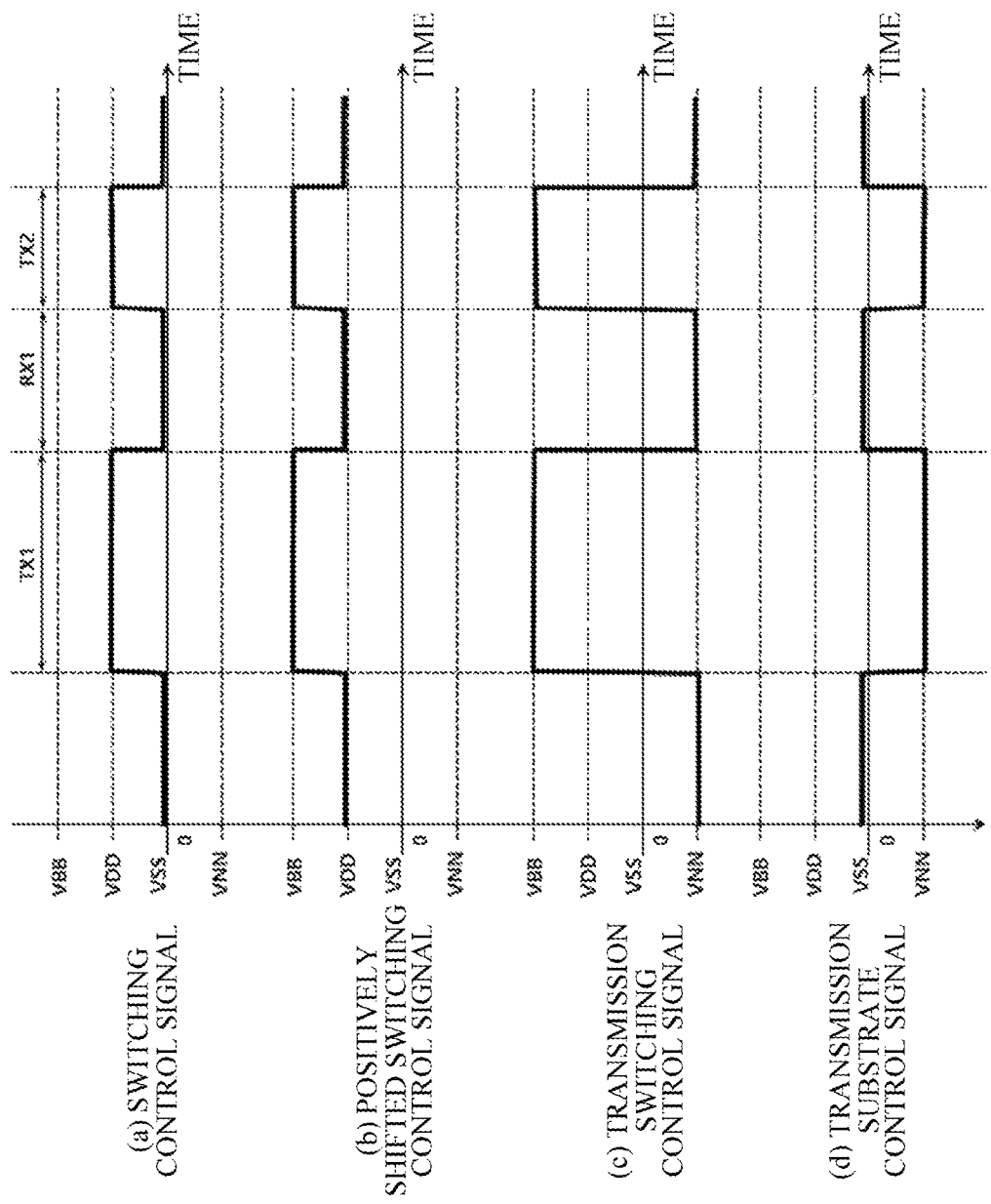
FIG. 7 is a timing diagram illustrating control signals generated by the switching signal boosting circuit.

Description of FIG. 7

FIG. 7 is a timing diagram illustrating control signals generated by the switching signal boosting circuit shown in FIG. 5.

In the drawing, VDD is the system supply voltage, VSS is the reference voltage, VBB is the boosted supply voltage generated by the voltage booster 210 in FIG. 5, and VNN is the negative supply voltage generated by the negative charge pump 270 in FIG. 5. In the illustrated embodiment, since the voltage booster 210 is implemented as a voltage doubler, VBB has a value approximately twice that of VDD.

As shown in the drawing, the switching control signal output by the controller is activated during the transmission cycles TX1 and TX2 to output the system supply voltage VDD, and is deactivated during the reception cycle RX1 to output the reference voltage VSS (a). Further, the positively shifted switching control signal output by the switching control signal positive shifter 230 shifts the switching control signal by as much as VDD in a positive direction to output the boosted supply voltage VBB during the transmission cycles TX1 and TX2, and is deactivated during the reception cycle RX1 to output the system supply voltage VDD (b). In addition, the transmission switching control signal EN2 is synchronized with the switching control signal to output the boosted supply voltage VBB during the transmission cycles TX1 and TX2, and is deactivated during the reception cycle RX1 to output the negative supply voltage VNN. Although not shown in the drawing, the negatively shifted switching control signal output by the switching control signal negative shifter 290 is a signal having an opposite phase to the positively shifted switching control signal, and the reception switching control signal output by the reception switching control signal generation unit is a signal having an opposite phase to the transmission switching control signal.

Description of Invention of Claim 4

Figure 6:
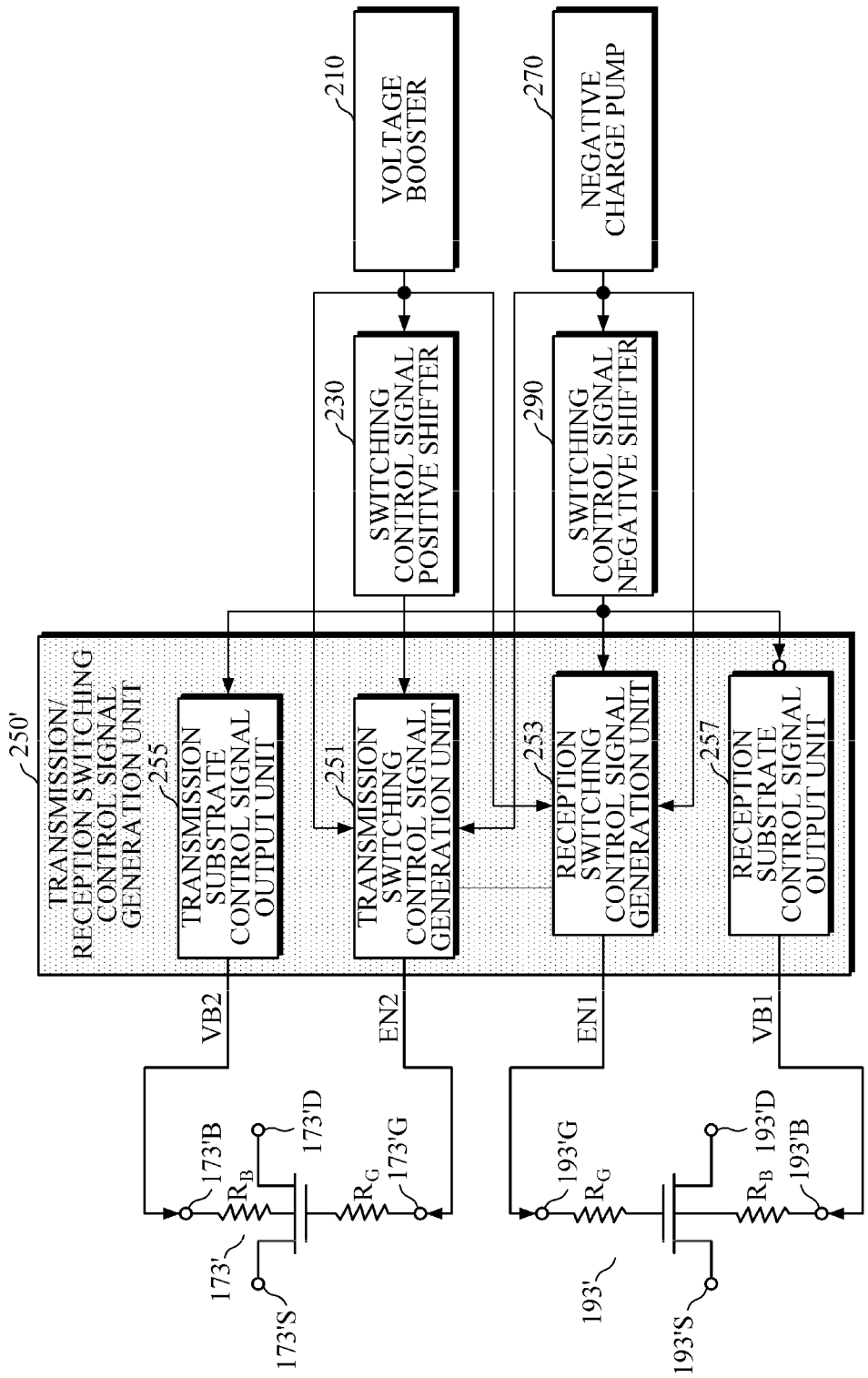
FIG. 6 is a block diagram illustrating a configuration according to one embodiment of the switching signal boosting circuit in FIG. 3.

FIG. 6 is a block diagram illustrating a configuration according to one embodiment of the switching signal boosting circuit 110' in FIG. 3. Components similar to those of the embodiment in FIG. 1 are referred to by the same reference numerals, and the corresponding components are distinguished by adding a single quote (') to the same number. Further, for convenience of understanding, illustration of the transmission semiconductor switch and the reception semiconductor switch is omitted except for one transmission high-voltage transistor 173' of the transmission semiconductor switch and one reception high-voltage transistor 193' of the reception semiconductor switch.

Compared with the embodiment in FIG. 5, there is a difference in that a transmission/reception switching control signal generation unit 250' further includes a transmission substrate control signal output unit 255 and a reception substrate control signal output unit 257. The transmission substrate control signal output unit 255 buffers the signal output from the switching control signal negative shifter 290 and applies the signal as a transmission substrate control signal to the substrate 173'B of the transmission high-voltage transistor 173' of the transmission semiconductor switch. The reception substrate control signal output unit 257 inverts and buffers the signal output from the switching control signal negative shifter 290 and applies the signal as a reception substrate control signal to the substrate 193'B of the reception high-voltage transistor 193' of the reception semiconductor switch.

Referring to FIG. 7 again, at the bottom, the transmission substrate control signal is compared with other control signals and displayed on the timing diagram. As shown in the drawing, since the transmission switching control signal, which swings between the boosted supply voltage and the negative supply voltage, is applied to the gate of the high-voltage transistor, and the transmission substrate control signal, which swings between the negative supply voltage and the reference voltage, is applied to the substrate thereof, a voltage difference between the gate and the substrate increases, and thus helps stable operation of the high-voltage transistor.

Description of Invention of Claim 5

FIGS. 8 to 11 are circuit diagrams respectively illustrating one embodiment of the voltage booster, the negative charge pump, the switching control signal positive shifter, the switching control signal negative shifter, and the transmission switching control signal generation unit shown in FIG. 5 or 6. Here, VDD is the system supply voltage, and VSS is the reference voltage of the system. Further, VBB is the boosted supply voltage output from the voltage booster, and VNN is the negative supply voltage output from the negative charge pump.

Figure 8:
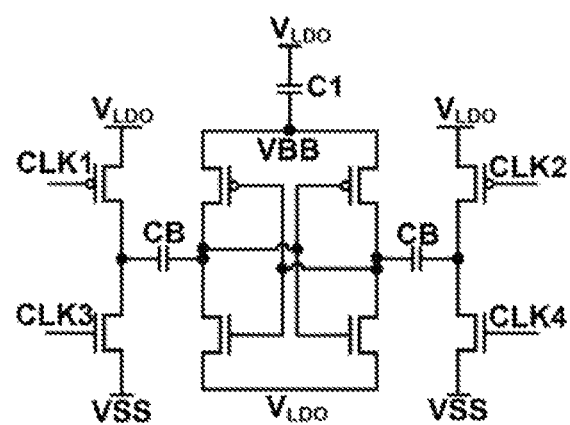
FIG. 8 is a circuit diagram illustrating one embodiment of a voltage booster in FIG. 5 or 6.

FIG. 8 is a circuit diagram illustrating one embodiment of the voltage booster in FIG. 5 or 6. In the illustrated embodiment, the voltage booster is a voltage doubler which outputs a voltage of $VBB=2\times V_{LDO}$ in which input $V_{LDO}$ is doubled by charging a charge supplied by the $V_{LDO}$ in a capacitor C1 through four transistors whose opening and closing are controlled by four clocks CLK1 to CLK4 sequentially activated so as not to overlap each other.

According to another aspect of the present invention, the power RF switch may further include a voltage limiting circuit which limits the boosted supply voltage generated by the voltage booster to a predetermined level to prevent a breakdown of the high-voltage transistor under the absolute maximum rating (AMR) condition. In the illustrated embodiment, the system supply voltage is applied as a voltage supplied to the voltage doubler through a low dropout (LDO) regulator without being directly applied. Accordingly, the maximum voltage of VBB output by the voltage doubler may be limited to $2\times V_{LDO}$. Accordingly, since the maximum value of the voltage applied to the gate of the high-voltage transistor may be limited to this value, breakdown may be prevented.

Figure 9:
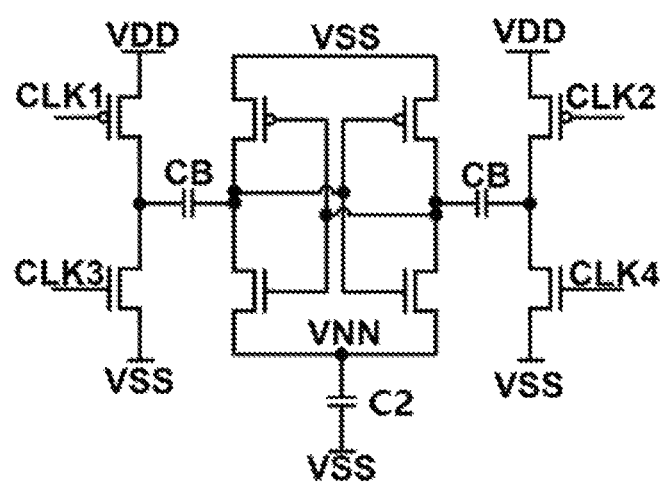
FIG. 9 is a circuit diagram illustrating one embodiment of a negative charge pump in FIG. 5 or 6.

FIG. 9 is a circuit diagram illustrating one embodiment of the negative charge pump in FIG. 5 or 6. In the illustrated circuit, the negative charge pump is a negative charge pump which outputs a voltage having an opposite polarity to the system supply voltage by charging a charge supplied by the system supply voltage VDD in a capacitor C2 through four transistors whose opening and closing are controlled by four clocks CLK1 to CLK4 sequentially activated so as not to overlap each other.

Figure 10:
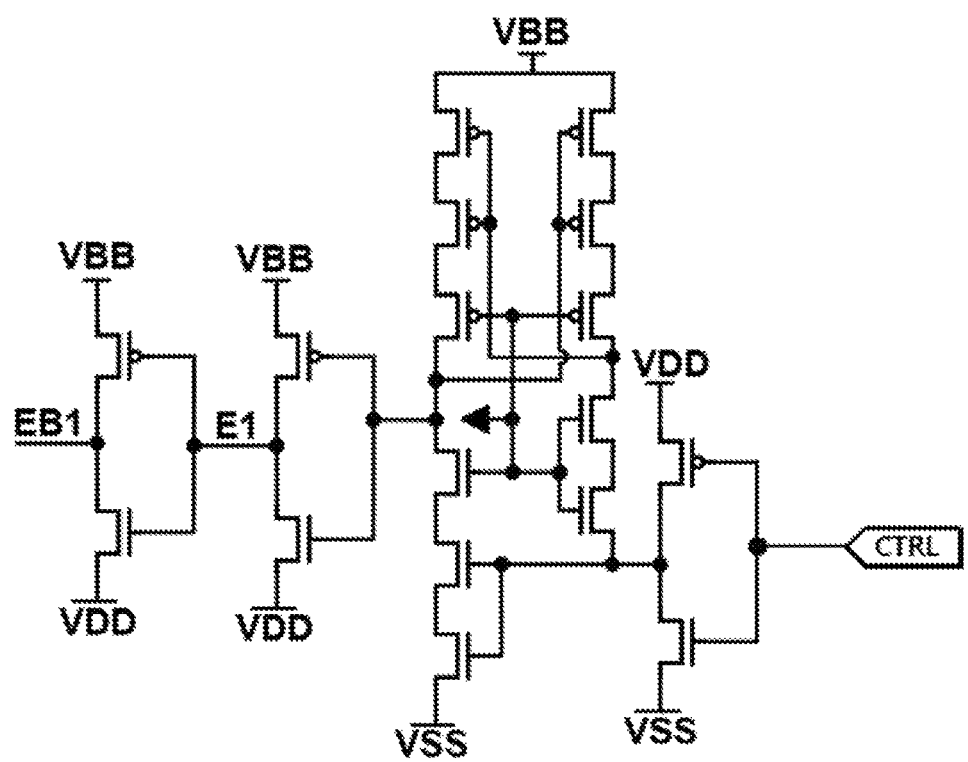
FIG. 10 is a circuit diagram illustrating one embodiment of a switching control signal positive shifter in FIG. 5 or 6.

Description of FIG. 10

FIG. 10 is a circuit diagram illustrating one embodiment of the switching control signal positive shifter in FIG. 5 or 6. A circuit part in which an N-type FET and a P-type FET at a right side are connected in series is an inverting buffer which buffers a switching control signal CTRL input from the controller. Thereafter, a structure in which three N-type FETs and three P-type FETs connected in series and three N-type FETs and three P-type FETs connected in series between VBB and VSS are connected in parallel shifts the switching control signal which swings between VDD and VSS to a signal which swings between VBB and VDD with an opposite phase. Here, a node indicated by a left arrow is connected to VDD. Thereafter, the N-type FET and the P-type FET connected in series between VBB and VDD are an output buffer which outputs an E1 signal. Thereafter, the E1 signal is inverted and buffered to output an EB1 signal.

Figure 11:
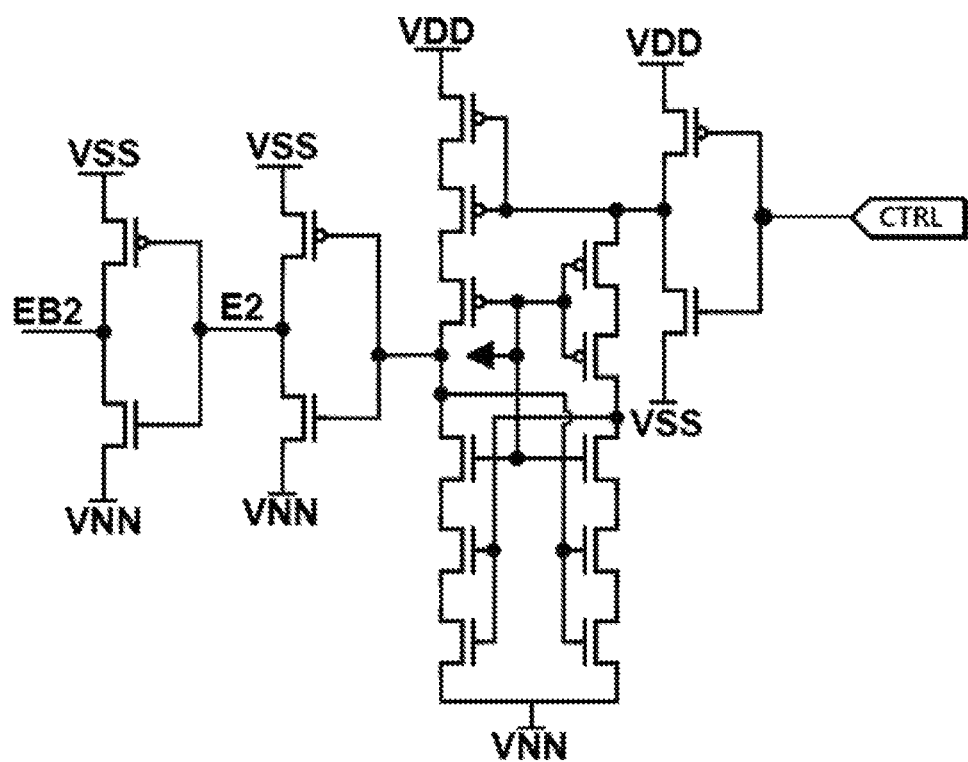
FIG. 11 is a circuit diagram illustrating one embodiment of a switching control signal negative shifter in FIG. 5 or 6.

FIG. 11 is a circuit diagram illustrating one embodiment of the switching control signal negative shifter in FIG. 5 or 6. A circuit part in which an N-type FET and a P-type FET at a right side are connected in series is an inverting buffer which buffers a switching control signal CTRL input from the controller. Thereafter, a structure in which three N-type FETs and three P-type FETs connected in series and three N-type FETs and three P-type FETs connected in series between VDD and VNN are connected in parallel shifts the switching control signal which swings between VDD and VSS to a signal which swings between VSS and VNN with an opposite phase. Here, a node indicated by a left arrow is connected to VSS. Thereafter, the N-type FET and the P-type FET connected in series between VBB and VDD are an output buffer which outputs an E2 signal. Thereafter, the E2 signal is inverted and buffered to output an EB2 signal.

Figure 12:
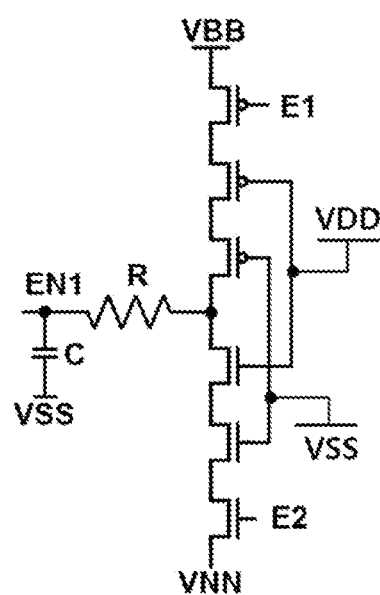
FIG. 12 is a circuit diagram illustrating one embodiment of a transmission switching control signal generation unit in FIG. 5 or 6.

FIG. 12 is a circuit diagram illustrating one embodiment of the transmission switching control signal generation unit in FIG. 5 or 6. Three N-type FETs and three P-type FETs connected in series between VBB and VNN are open and closed by the E1 signal which swings between VBB and VDD and the E2 signal which swings between VSS and VNN to charge and discharge a capacitor C connected to an output terminal. Accordingly, the E1 signal which swings between VBB and VNN is output to the output terminal. The reception switching control signal generation unit is the same as the transmission switching control signal generation unit but has a difference in that the inverted input signals EB1 and EB2 are input thereto.

Meanwhile, in the present invention, according to a specific aspect, the boosted supply voltage and the negative supply voltage are generated, and accordingly, when the power RF switch to which the present invention is applied is implemented as a semiconductor integrated circuit, the capacitor C1 of an output terminal of the voltage booster shown in FIG. 8 or the capacitor C2 of an output terminal of the negative charge pump shown in FIG. 9 occupies the largest area. In a complementary metal-oxide semiconductor (CMOS) process, on-chip capacitors having various structures such as a metal-oxide-metal (MOM) capacitor, a metal-insulator-metal (MIM) capacitor, a metal-oxide-semiconductor (MOS) capacitor, and the like are known.

Figure 13:
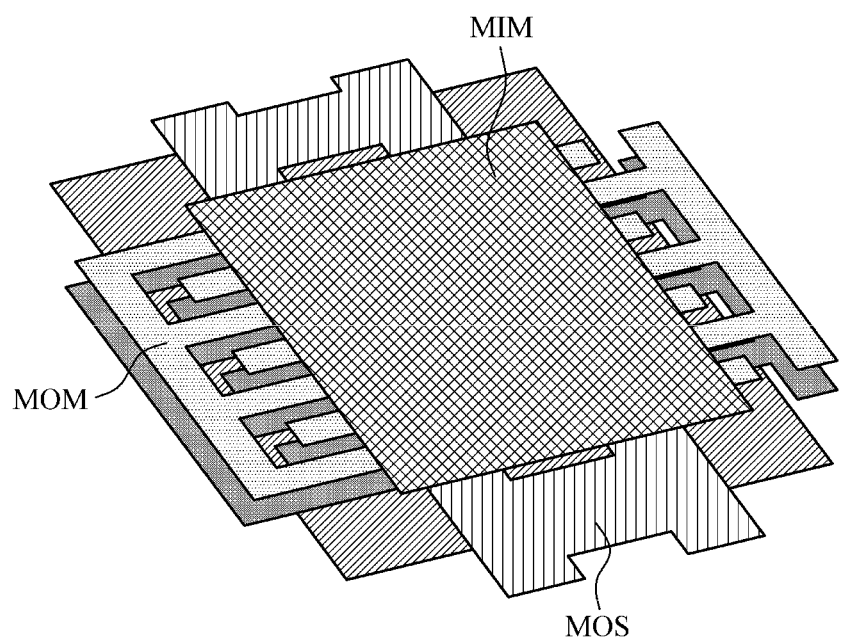
FIG. 13 is a view illustrating a structure of an on-chip capacitor of an output terminal of the voltage booster or the negative charge pump.

According to another aspect of the present invention, the capacitor of the output terminal of any one of the voltage booster and the negative charge pump may include a structure in which the MOS capacitor, the MOM capacitor, and the MIM capacitor are sequentially stacked and connected in parallel. FIG. 13 is a view illustrating a structure of an on-chip capacitor of an output terminal of the voltage booster or the negative charge pump. According to a design rule, the MOS capacitor is disposed at the bottom, and the MOM capacitor has a structure including alternately disposed parallel electrodes and thus is disposed between the MIM capacitor and the MOS capacitor.

According to the present invention, harmonic performance and intermodulation distortion performance of a radio frequency (RF) switch can be improved by applying voltage boosting to control a gate of a transistor to a high voltage and turn on the transistor. Further, it is possible to avoid a problem in that a high-voltage transistor is damaged under a maximum rating voltage condition by limiting a maximum voltage to a predetermined level when a boosted supply voltage is generated.

Further, since a special stacked capacitor structure is employed to integrate a large-capacity capacitor which can be a problem when this technology is employed, an area of a circuit can be reduced and thus economical implementation is possible.

In the above, although the present invention has been described with reference to the accompanying drawings, the present invention is not limited thereto, and should be understood to encompass various modifications which may be clearly derived by those skilled in the art. The claims are intended to encompass these modifications.

What is claimed is:
1. A power radio frequency (RF) switch comprising:
a transmission semiconductor switch having one end connected to an external antenna and the other end connected to an external transmission circuit, and switched by a transmission switching control signal;
a reception semiconductor switch having one end connected to an external antenna and the other end con- nected to an external reception circuit, and switched by a reception switching control signal;

a controller configured to output a switching control signal which indicates one connected switch of the transmission semiconductor switch and the reception semiconductor switch; and a switching signal boosting circuit configured to output the transmission switching control signal and the reception switching control signal having opposite phases according to the switching control signal, wherein each of the transmission switching control signal and the reception switching control signal swings between a boosted supply voltage in which a system supply voltage is boosted and a negative supply voltage in which a polarity of the system supply voltage is inverted, wherein the switching signal boosting circuit applies the transmission switching control signal which swings between the boosted supply voltage and the negative supply voltage to a gate of a transmission high-voltage transistor of the transmission semiconductor switch, applies a transmission substrate control signal synchronized with the transmission switching control signal to swing between the negative supply voltage and a reference voltage to a substrate of the transmission high-voltage transistor, applies the reception switching control signal having an opposite phase to the transmission switching control signal to a gate of a reception high-voltage transistor of the reception semiconductor switch, and applies a reception substrate control signal having an opposite phase to the transmission substrate control signal to a substrate of the reception high-voltage transistor.

2. A power radio frequency (RF) switch comprising:

a transmission semiconductor switch having one end connected to an external antenna and the other end connected to an external transmission circuit, and switched by a transmission switching control signal;

a reception semiconductor switch having one end connected to an external antenna and the other end connected to an external reception circuit, and switched by a reception switching control signal;

a controller configured to output a switching control signal which indicates one connected switch of the transmission semiconductor switch and the reception semiconductor switch; and a switching signal boosting circuit configured to output the transmission switching control signal and the reception switching control signal having opposite phases according to the switching control signal, wherein each of the transmission switching control signal and the reception switching control signal swings between a boosted supply voltage in which a system supply voltage is boosted and a negative supply voltage in which a polarity of the system supply voltage is inverted, wherein the switching signal boosting circuit includes:

a voltage booster configured to boost the system supply voltage to output the boosted supply voltage;

a switching control signal positive shifter to which the boosted supply voltage is applied, and configured to generate a positively shifted switching control signal, which swings between the boosted supply voltage and the system supply voltage, from the switching control signal output from the controller and output the positively shifted switching control signal;

a negative charge pump configured to invert the polarity of the system supply voltage to output the negative supply voltage;

a switching control signal negative shifter to which the negative supply voltage is applied, and configured to generate a negatively shifted switching control signal which swings between the reference voltage and the negative supply voltage, from the switching control signal output from the controller and output the negatively shifted switching control signal; and a transmission/reception switching control signal generation unit to which the boosted supply voltage and the negative supply voltage are applied, and including a transmission switching control signal generation unit configured to generate a transmission switching control signal controlled by the positively shifted switching control signal and the negatively shifted switching control signal to swing between the boosted supply voltage and the negative supply voltage and output the transmission switching control signal, and a reception switching control signal generation unit configured to generate a reception switching control signal having an opposite phase to the transmission switching control signal and output the reception switching control signal.

3. The power RF switch of claim 2, wherein the transmission/reception switching control signal generation unit further includes:

a transmission substrate control signal output unit configured to buffer a signal output from the switching control signal negative shifter and apply the signal as a transmission substrate control signal to the substrate of the transmission high-voltage transistor of the transmission semiconductor switch; and a reception substrate control signal output unit configured to invert and buffer the signal output from the switching control signal negative shifter and apply the signal as a reception substrate control signal to the substrate of the reception high-voltage transistor of the reception semiconductor switch.

4. The power RF switch of claim 2, wherein the voltage booster further includes a voltage limiting circuit configured to limit the boosted supply voltage to be output to a predetermined level.

5. The power RF switch of claim 2, wherein a capacitor of an output terminal of any one of the voltage booster and a negative charge pump includes a structure in which a metal-insulator-metal (MIM) capacitor, a metal-oxide-metal (MOM) capacitor, and a metal-oxide-semiconductor (MOS) capacitor are sequentially stacked and connected in parallel.

* * * * *